US007071416B2

(12) United States Patent
Ricco et al.

(10) Patent No.: US 7,071,416 B2
(45) Date of Patent: Jul. 4, 2006

(54) CONNECTOR MEMBER FOR ELECTRICAL CONNECTIONS THROUGH A WALL OF A FUEL TANK, PARTICULARLY FOR THE LPG FUEL TANK OF A MOTOR VEHICLE

(75) Inventors: Mario Ricco, Casamassima (Bari) (IT); Sisto Luigi De Matthaeis, Modugno (Bari) (IT); Claudio Amorese, Corato (Bari) (IT); Onofrio De Michele, Castellana Grotte (Bari) (IT); Annunziata Anna Satriano, Orbassano (Turin) (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 0 days.

(21) Appl. No.: 10/799,887

(22) Filed: Mar. 15, 2004

(65) Prior Publication Data

US 2004/0188121 A1 Sep. 30, 2004

(30) Foreign Application Priority Data

Mar. 27, 2003 (IT) .......................... TO2003A0230

(51) Int. Cl.
*H02G 3/00* (2006.01)

(52) U.S. Cl. .................. 174/100; 174/151; 174/152 R; 174/153 R; 174/65 SS; 174/65 R; 174/65 G; 174/152 G; 174/153 G; 16/2.1; 16/2.2; 439/604; 439/274; 248/56

(58) Field of Classification Search ................ 174/100, 174/151, 152 R, 153 R, 65 SS, 65 G, 65 R, 174/152 G, 153 G; 16/2.1, 2.2; 439/604, 439/274; 248/56
See application file for complete search history.

(56) References Cited

U.S. PATENT DOCUMENTS

| | | | | |
|---|---|---|---|---|
| 4,458,108 | A * | 7/1984 | Kashimoto et al. | 174/152 R |
| 6,150,607 | A * | 11/2000 | Weyl et al. | 174/65 G |
| 6,305,989 | B1 * | 10/2001 | Quadir | 439/685 |
| 6,452,099 | B1 * | 9/2002 | Miller et al. | 174/65 G |

* cited by examiner

*Primary Examiner*—Dean A. Reichard
*Assistant Examiner*—Anton Harris
(74) *Attorney, Agent, or Firm*—Sughrue Mion, PLLC

(57) ABSTRACT

A fuel tank for motor vehicles, for example an LPG fuel tank, contains inside it at least one electrical component and has a wall or a plate bearing at least one connector for connection of the electrical component with an electrical line external to the tank. The electrical connector has a body made of synthetic material or of elastomer material directly moulded on one or more conductor pins so as to guarantee hermetic sealing of the tank even in the presence of a pressure jump between the internal cavity of the tank and the external environment. In the case where the body of the connector is made of synthetic material, it bears seats for seal rings made of elastomer material. In the case where it is made of elastomer material, it guarantees directly the function of tightness. In either case, there are provided means for exerting an axial compressive force on the part that performs the tightness function.

1 Claim, 5 Drawing Sheets

PRIOR ART

CONNECTOR MEMBER FOR ELECTRICAL CONNECTIONS THROUGH A WALL OF A FUEL TANK, PARTICULARLY FOR THE LPG FUEL TANK OF A MOTOR VEHICLE

BACKGROUND OF THE INVENTION

The present invention relates to fuel tanks for motor vehicles, in particular to Liquid Petroleum Gas (LPG) fuel tanks for motor vehicles.

For some time now the present applicant has studied and developed systems of supply via injection of LPG for engines of motor vehicles, which use a plurality of LPG injectors associated to the cylinders of the engine, which are supplied with LPG coming from a tank.

Supply systems of the type referred to above are, for example, described and illustrated in the European patent No. EP-B-0 725 205 and in the European patent No. EP-B-0 922 851 in the name of the present applicant, as well as in the corresponding patents Nos. U.S. Pat. No. 5,592,924 and U.S. Pat. No. 6,050,237. The present applicant has also filed various patent applications regarding the tank of the supply system in question and to the various electrical and hydraulic components that are associated thereto. Typically, the tank has a hollow body, within which there are housed one or more electrical components. For example, provided within the tank is a pump for supply of the LPG, designed to operate submersed in the LPG contained within the tank and actuated by an electric motor also contained within the tank. The tank is also provided with one or more level sensors that also require electrical connections.

The various pipe unions for connection of the tank with the electrical and hydraulic lines of the system for supplying LPG to the engine of the motor vehicle are provided on a closing plate that covers a mouth provided in the body of the tank. A structure of this type is, for example, described and illustrated in the European patent application No. EP 1 249 596 in the name of the present applicant. With the purpose of enabling electrical connection between the electrical components contained within the tank and the electrical lines external to the tank, the aforesaid closing plate is provided with one or more connector members that must, on the one hand, guarantee electrical connection and, on the other hand, guarantee hermetic sealing of the tank in the presence of a pressure difference between the inside of the tank and the outside, such as the one that occurs during operation with LPG supply systems of the type referred to above.

Of course, the same problem may also arise in supply systems which use different fuels, such as tanks for methane supply systems or in general any other fuel tank in which it is necessary, on the one hand, to enable electrical connection with components arranged within the tank and, on the other hand, guarantee hermetic sealing of the tank itself, in particular in the presence of a pressure jump between the inside and the outside.

FIG. 2 of the annexed drawings illustrates a connector member according to the known art, used in tanks of the type referred to above. In FIG. 2, the reference number 1 designates a portion of the wall or closing plate of the tank, which has a through opening 2, in which there is mounted a steel bushing 3 provided with a flange 4 with holes 5 (only one of which may be seen in the figure) for engagement of fixing screws to the wall 1. The bushing 3 has, on its outer surface, a circumferential groove, in which there is received a seal ring 6, which ensures tightness between the bushing 3 and the wall 1. Set within the bushing 3 is a glass disk 7, obtained by fusion directly within the bushing 3 so as to make it adhere thereto. The disk 7 is also melted directly on four conductor pins 8 (only three of which are visible in the figure), which project axially from the opposite ends of the bushing 3 and from the opposite faces of the wall 1, each conductor pin being designed to be connected at its ends respectively to a line for internal connection to the tank and to a line for external connection to the tank.

In the electrical connectors of the known type illustrated above, the glass molten directly within the steel bushing 3 and on the conductor pins 8 ensures hermetic sealing of the tank also in the presence of a pressure difference between the inside and the outside. The drawback of said known solution lies in the fact that the glass disk 7 is relatively brittle and is subject to the risk of cracking or fracturing resulting, for example, from thermal shock or possible careless manipulation of the tank or its components, particularly in the assembly and installation step. For instance, the operator responsible for installation can inadvertently deform one or more of the conductor pins 8 during their electrical connection to the respective connection terminals, with consequent mechanical stressing of the glass disk 7.

A further drawback lies in the fact that the known devices of the type referred to above are relatively complex and costly to produce.

SUMMARY OF THE INVENTION

The purpose of the present invention is to provide a connector member for electrical connections through a wall of the fuel tank of a motor vehicle that will be free from the drawbacks mentioned above. It is, in particular, a purpose of the invention to provide a connector member that, on the one hand, will be able to guarantee hermetic sealing of the tank even in the presence of a pressure difference between the internal cavity of the tank and the external environment, and, on the other hand, will have a relatively simple and inexpensive structure, which is resistant and reliable in operation.

With a view to achieving said purpose, the subject of the present invention is a connector member for electrical connections through a wall of the fuel tank of a motor vehicle, characterized in that it comprises a body at least partially made of synthetic material or of elastomer material, in which there is embedded one or more conductor pins emerging from both of the ends of said body.

In a first embodiment, the body of the electrical connector is made of synthetic material directly moulded on the conductor pins and has seats for seal rings that guarantee tightness between the body of the connector and the seat in which it is received, as well as between the body of the connector and each conductor pin. Preferably, in the case of said embodiment, the body of the connector has a cylindrical portion designed to be received in a through hole of a wall or closing plate of the tank, with an end flange provided with holes for engagement of fixing screws to said wall or plate. The cylindrical portion has a circumferential groove, which receives a seal ring designed to cooperate with the surface of the hole that functions as seat for the connector, whilst the end flange of the body of the connector has, on its front face, one or more seats for seal rings, which are each set between a respective conductor pin and the body of the connector. Once again in this case, the seal rings associated to the various conductor pins are compressed axially by respective portions projecting within said cavities of a covering plate, which is juxtaposed with the flange of the connector and secured thereto, for example, by means of the said screws for fixing the connector to the closing plate of the tank.

In a second embodiment, the entire body of the connector consists of a synthetic or elastomer material directly moulded on the conductor pins and designed to ensure tightness both in an area corresponding to the surface of contact between the conductor pins and the body of the connector, and in an area corresponding to the surface of contact between the body of the connector and the wall of the hole in the closing plate of the tank that functions as seat for the connector itself. Also in the case of said second embodiment there is preferably provided an auxiliary plate that is secured to the plate of the tank in order to set the body of the connector under a compressive load in its seat within the plate of the tank, so as to guarantee that it will be able to perform the function of seal in an optimal way.

Thanks to the characteristics referred to above, the electrical cable-lead connector of the invention is able, on the one hand, to ensure efficient electrical connection of the electrical components arranged within the tank with the external electrical lines and, on the other hand, to guarantee hermetic sealing of the tank also in the presence of major pressure jumps between the internal cavity of the tank and the external environment. The structure of the electrical connector according to the invention is moreover relatively simple and inexpensive to produce. Finally, the device according to the invention is not subject to the risks of failure that occur, instead, in the case of the known art on account of the fragility of the element made of glass described above.

BRIEF DESCRIPTION OF THE DRAWINGS

Further characteristics and advantages will emerge from the ensuing description, with reference to the annexed drawings, which are provided purely by way of non-limiting example and in which.

DETAILED DESCRIPTION OF THE INVENTION

Figure 1:
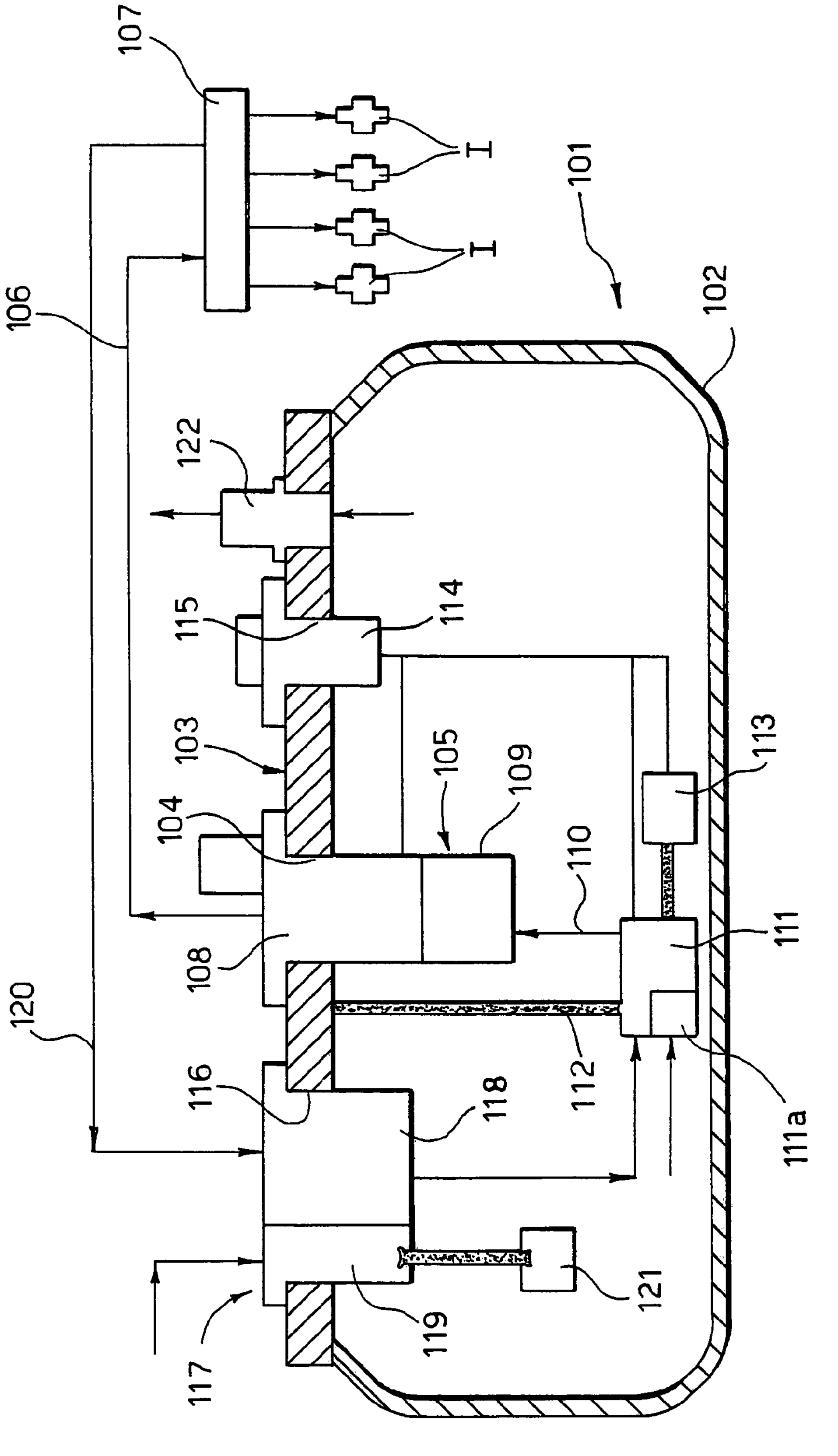
FIG. 1 is a schematic illustration provided by way of example of an LPG fuel tank according to the known art.

In FIG. 1, the reference number 101 designates as a whole an LPG fuel tank built according to the known art, for supplying LPG to a plurality of injectors I associated to the various cylinders of the engine. The tank 101 has a hollow structure 102 built so as to guarantee tightness at the working pressures expected for a system of the type in question. The hollow structure 102 has a top opening closed by a service flange 103 carrying the various connector elements and providing connection of the tank to the supply system. For this purpose, the tank 101 has a first through opening 104, through which there is installed the structure of an assembly 105 connected to a line 106 for delivery of the LPG to a distribution manifold or rail 107, which distributes the LPG between the various injectors I. The assembly 105 includes a shut-off solenoid valve 108, which is designed to close, so interrupting communication of the tank with the outside environment in pre-determined emergency conditions, as well as a flow-limiting valve 109. The assembly 105 receives the LPG through the line 110 from the pump 111 controlled by an electric motor 111*a*, the structure of which is connected by means of a connection element 112 to the service flange 103. Installation of the pump 111 can in any case be carried out in any other way, as will be indicated also in what follows. To the structure of the pump 111 there is moreover connected the structure of a sensor device 113 for detecting the level of LPG. The electrical supply of the solenoid valve 8, of the pump 111, and of the sensor 113 is guaranteed by an electrical connector 114, which is mounted via a through opening 115 of the service flange 103.

As already amply illustrated, the present invention relates to new embodiments of said connector.

The flange 103 moreover has a further through opening 116, within which is installed an assembly 117 including two valves 118, 119. The valve 118 is a return valve, which is connected to a line 120 for flow back into the tank of the LPG supplied in excess to the rail 107. The valve 119 is the valve used for filling the tank and is associated to a further level-sensor 121. Associated to the flange 103 is moreover a safety valve 122, which prevents the pressure within the tank from exceeding a pre-determined threshold value.

FIG. 1 shows a traditional solution of tank, in which the flange 103 has through holes traversed by the various components described previously. The present invention could also be made with a tank having an innovative structure that has formed the subject of the preceding Italian patent application No. TO2001A000360 in the name of the present applicant, in which at least some of the aforesaid components are fixed to the bottom surface of the plate, without passing through it.

Figure 2:
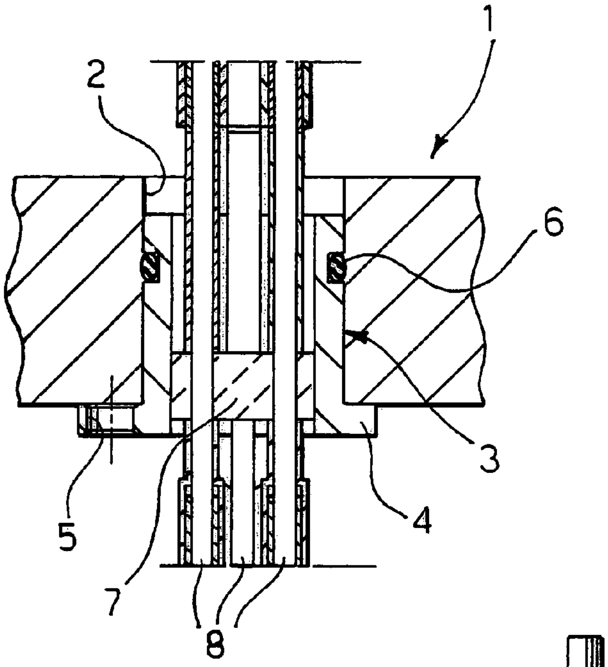
FIG. 2 illustrates the connector member according to the known art, already described above.

In FIGS. 3–8, the parts corresponding to the ones illustrated in FIG. 2 are indicated with the same reference numbers.

Figure 4:
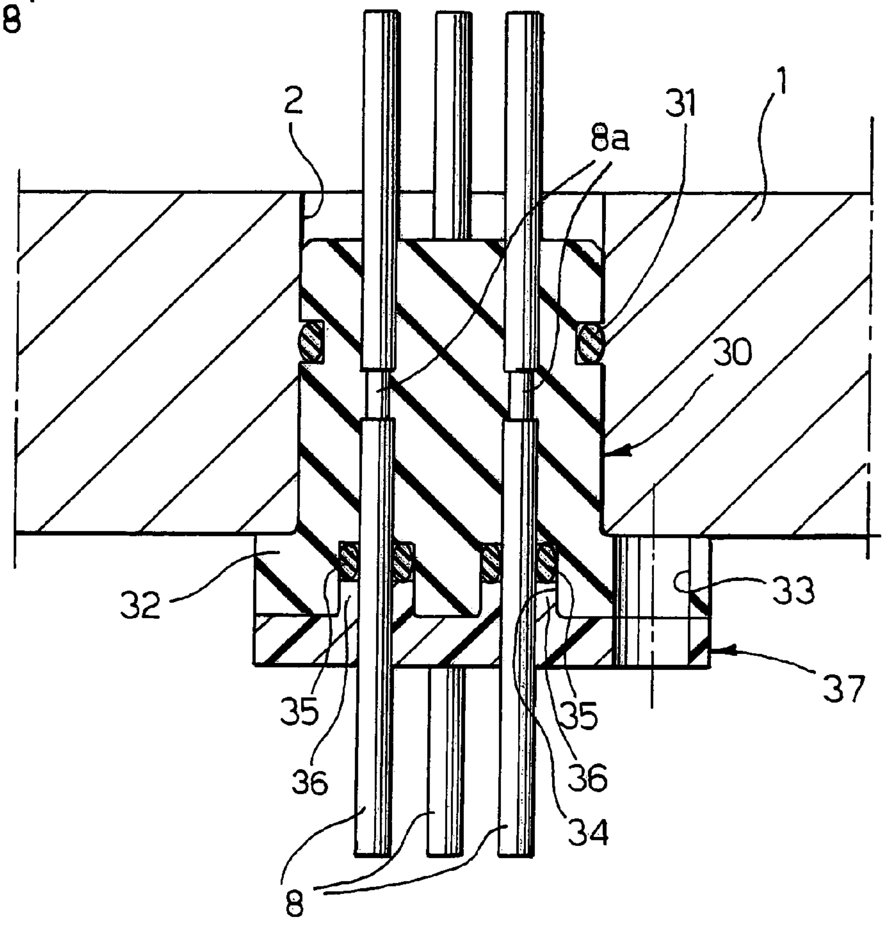
PRIOR ART Fig 4
FIG. 4 is a cross-sectional view of the connector of FIG. 3.
Figure 3:
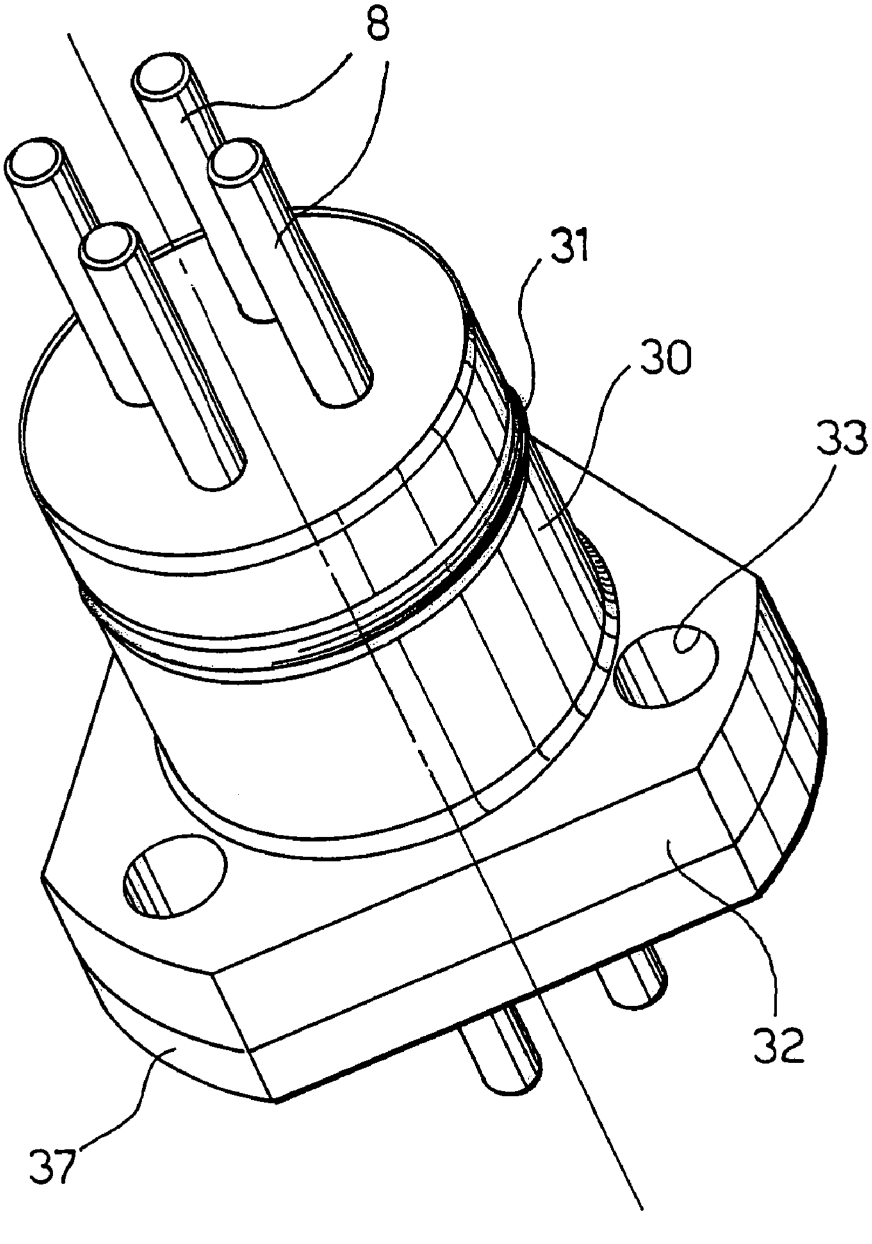
FIG. 3 is a perspective view of a first embodiment of an electrical connector according to the invention.

In the case of the solution illustrated in FIGS. 3 and 4, the electrical connector comprises a body 30 made of synthetic material, for example thermoplastic material, which is moulded directly onto the conductor pins 8. In order to improve the seal of the connection between the body 30 and the pins 8 with respect to possible axial movements of said pins, the latter have portions 8*a* of small cross section, around which there is also engaged the material of the body 30. The body 30 of the connector has a cylindrical portion, which is designed to be received in the hole 2 of the plate 1 and has a circumferential groove, in which a seal ring 31 is mounted that ensures the seal between the wall of the body 30 and the wall of the hole 2. The body 30 moreover incorporates, in a single piece, a flange 32 with holes 33 for engagement of fixing screws (not illustrated) to the plate 1. On its front face, the flange 32 has axial cavities 34, each of which is traversed by a respective conductor pin 8. A seal ring 35 is set between each conductor pin 8 and the wall of the respective cavity 34, with the purpose of guaranteeing tightness also in the presence of a pressure jump between the surface of each conductor pin 8 and the body 30 of the connector. For the purpose of improving the seal, each seal ring 35 is pre-loaded axially in so far as it is pressed by a respective projecting portion 36 of a covering plate 37, which is juxtaposed with the flange 32 and is fixed thereto by means of the same fixing screws that secure the flange to the plate 1.

FIGS. 5–8 illustrate four variants of a second embodiment of the invention, which differs from the one illustrated in FIGS. 3 and 4 in that it does not comprise seal rings, in so far as it is the very body of the connector that also performs the function of seal. Also in said figures, the parts corresponding to the ones of the figures already described above are designated by the same reference numbers.

Figure 5:
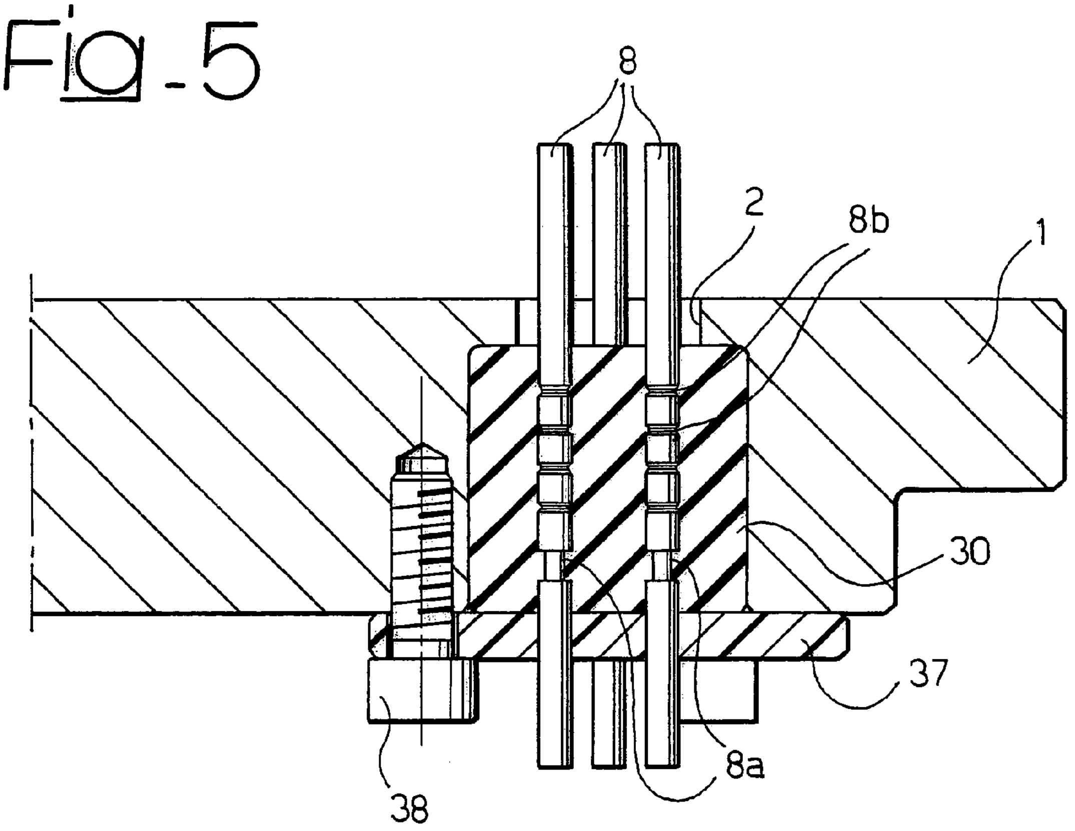
FIGS. 5, 6, 7 and 8 illustrate four different variants of a second embodiment of the invention.

In the case of FIG. 5, the body 30 of the connector consists of a cylindrical block made of elastomer material received in a respective seat, defined by the wall of the hole 2 and pressed axially against an annular contrast of the hole 2 by a plate 37 fixed to the plate 1 by means of screws 38. The conductor pins 8 have, in addition to the restricted sections 8*a*, also portions with a labyrinth profile 8*b*, for the purpose of improving further the seal between the body 30 and the pins 8. As already mentioned, it is the very body 30, which is made of elastomer material, that ensures tightness also in the presence of a pressure jump. The covering plate 37 also guarantees the stability of the connection between the plate 1 and the body 30 during manipulation of the plate 1 in the installation stage.

Figure 6:
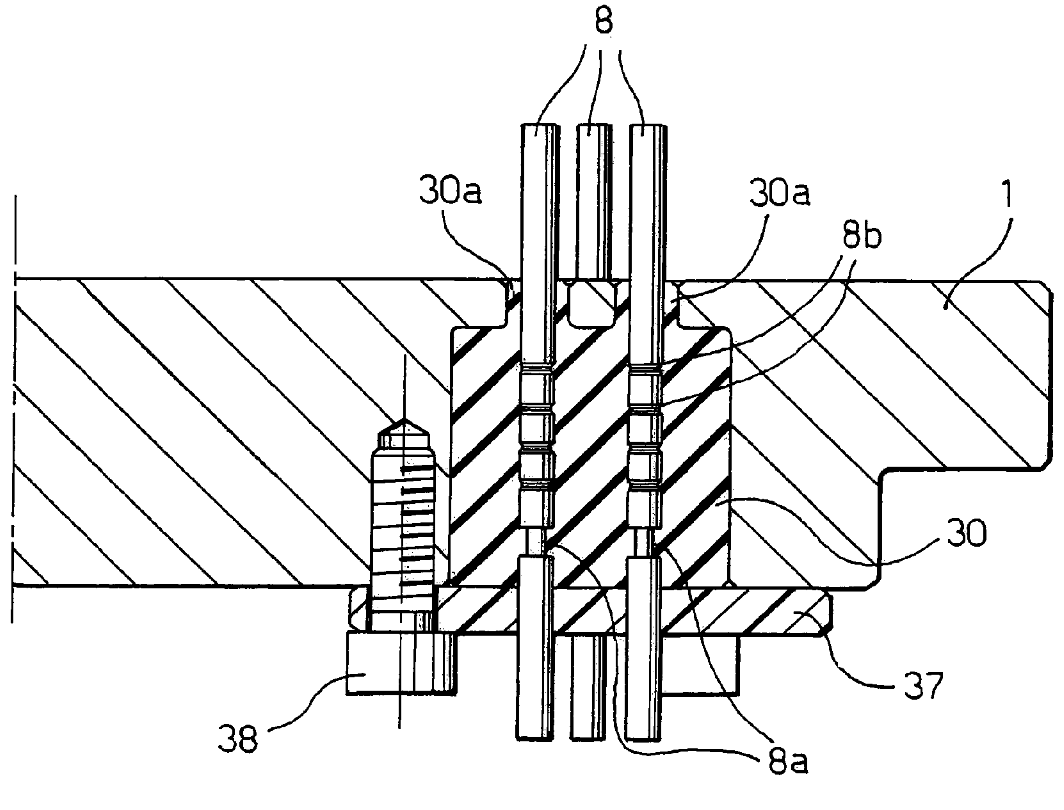

FIG. 6 illustrates a solution substantially corresponding to that of FIG. 4 except that, in this case, the plate 1 has, on its face facing the outside of the tank, four separate holes communicating with a seat of the body 30, through which there are engaged four protuberances 30*a* of the body 30. Said construction is more complex as compared to that of FIG. 5, but safer from the standpoint of insulation of the conductor pins. The covering plate 37 has the same function already illustrated in FIG. 4 and is preferably made, as already in the case of FIG. 5, of plastic material.

Figure 7:
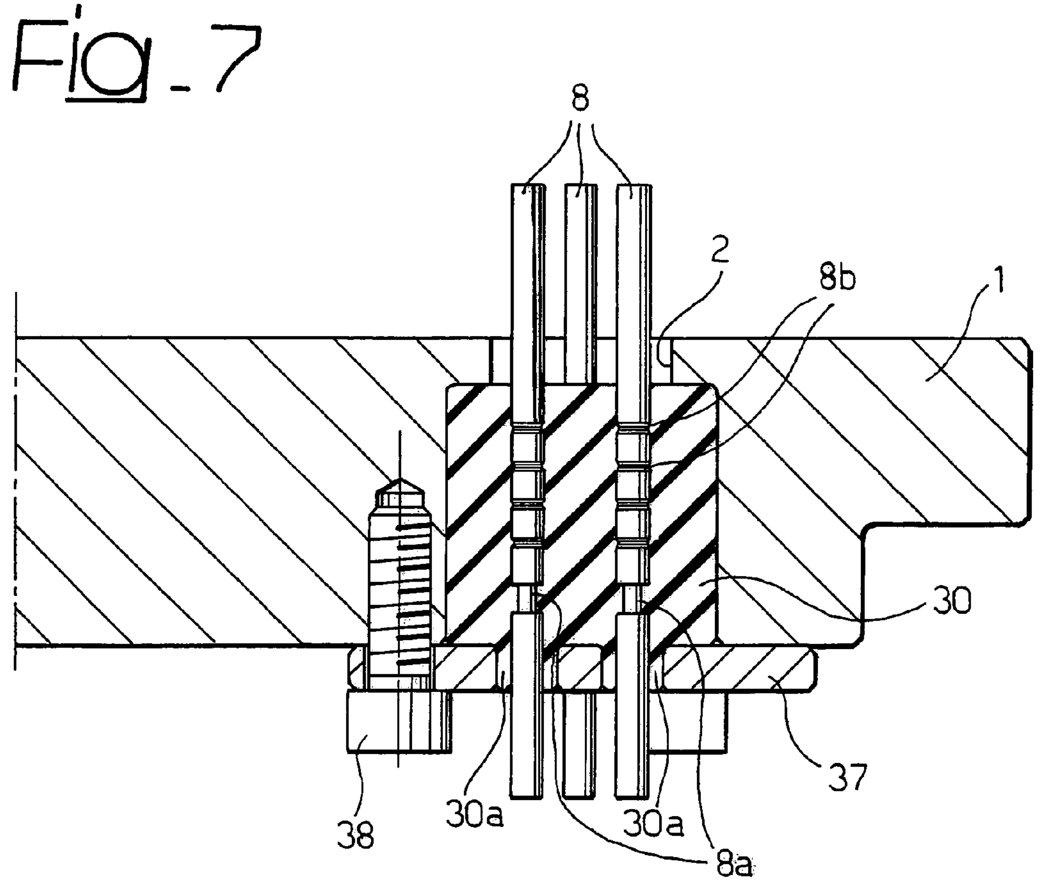

FIG. 7 illustrates a further variant that is substantially similar to that of FIG. 6, with the single difference that, in this case, the four protuberances 30*a* are provided on the opposite end of the body 30 and engage four corresponding holes made in the covering plate 37, which in this case is preferably made of metal material.

Figure 8:
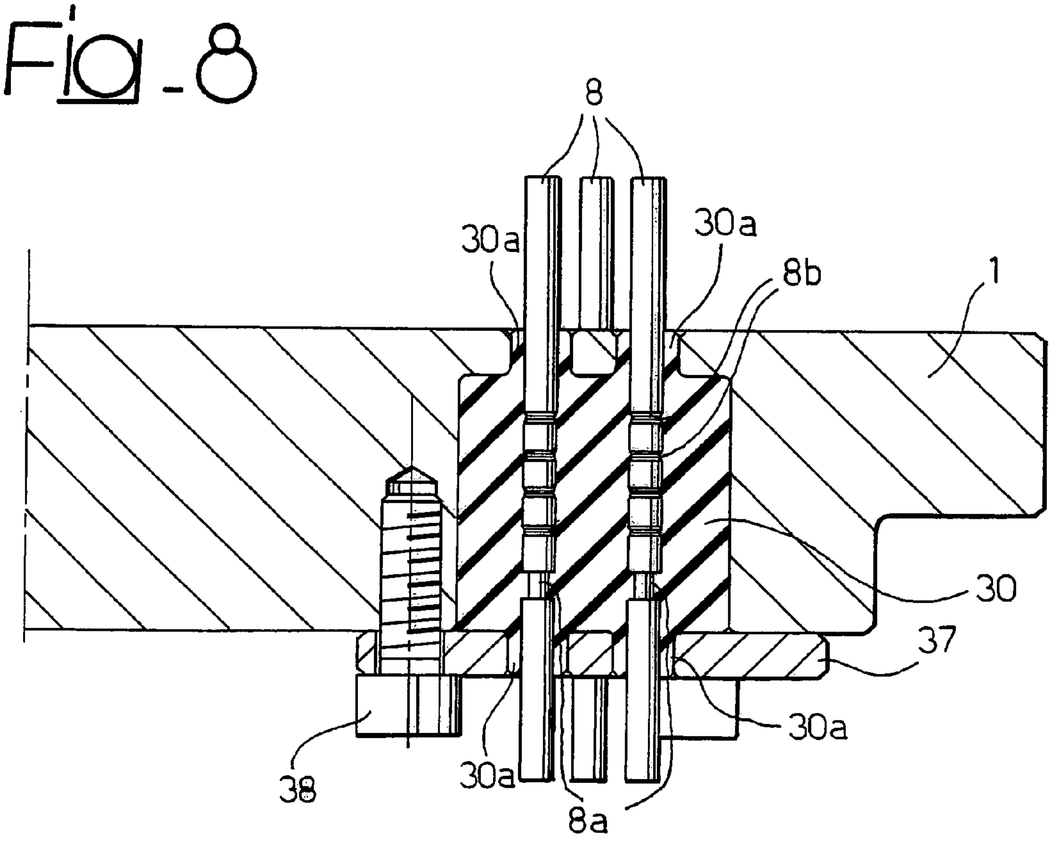

Finally, the solution of FIG. 8 is substantially the result of a combination of the variants of FIGS. 6 and 7, with protuberances 30*a* provided on both ends of the body 30 for engaging respective holes made both in the plate 1 and in the covering plate 37.

Of course, without prejudice to the principle of the invention, the details of construction and the embodiments may vary widely with respect to what is described and illustrated herein purely by way of example, without thereby departing from the scope of the present invention.

What is claimed is:

1. An LPG fuel tank for a motor vehicle designed to operate with a pressure within the tank higher than external pressure, comprising a closure plate having a through hole and a connector member for electrical connections through said closure plate, wherein the connector member is comprised of a body at least partially made of synthetic material or of elastomer material, mounted within said through hole of the closure plate, with a least one conductor pin, directly embedded within the material of said body and projecting from opposite ends of the body, wherein said body has an outer surface with a circumferential groove within which a sealing ring is received which is in contact with the surface of said through hole, wherein said body further includes an end flange of greater diameter which is located outside said through hole and is in contact with an inner surface of said closure plate, wherein said end flange has a front surface, facing towards the inside of said tank, wherein said front surface includes axial cavities through which respective conductor pins are arranged, wherein a sealing ring is mounted within each of said front cavities with an inner surface in surface contact with a respective conductor pin and an outer surface in contact with a lateral wall of said front cavity, wherein said connector member further comprises a pressure plate formed by an element separate from said body, which rests against said front surface of said body and is connected to said closure plate by screws directed parallel to said conductor pins, so that tightening of said screws causes said closure plate to be pressed axially against said front surface of said body, wherein said pressure plate has a surface facing said body provided with a projections adapted to be engaged within respective front cavities of said body, so that when said screws are tightened each projection causes the sealing ring arranged within each of said front cavities to be compressed axially and to be expanded radially, so as to ensure proper sealing between each conductor pin and the lateral wall of the respective front cavity.

* * * * *